Oct. 14, 1969  MASAMICHI HINO  3,472,330
WEIGHING MACHINE

Filed Sept. 15, 1967  3 Sheets-Sheet 1

MASAMICHI HINO, INVENTOR

Oct. 14, 1969  MASAMICHI HINO  3,472,330
WEIGHING MACHINE
Filed Sept. 15, 1967  3 Sheets-Sheet 2

MASAMICHI HINO, INVENTOR

Oct. 14, 1969  MASAMICHI HINO  3,472,330
WEIGHING MACHINE

Filed Sept. 15, 1967  3 Sheets-Sheet 3

MASAMICHI HINO, INVENTOR

By Wenderoth, Lind & Ponack
ATTORNEYS 3,472,330
WEIGHING MACHINE
Masamichi Hino, Hirakata, Japan, assignor to Kubota Tekko Kabushiki Kaisha, also known as Kubota, Ltd., Osaka, Japan
Continuation-in-part of application Ser. No. 373,716, June 9, 1964. This application Sept. 15, 1967, Ser. No. 667,973
Claims priority, application Japan, Oct. 6, 1963, 38/55,480
Int. Cl. G01g 7/00
U.S. Cl. 177—214          6 Claims

ABSTRACT OF THE DISCLOSURE

A weighing machine consisting of a fulcrum, a beam supported on a fulcrum and on a part of which an object to be weighed is adapted to be positioned, a poise slidably mounted on the said beam, a load deflection detector, engageable by said beam for detecting the upward or downward load deflection of the beam when the poise comes adjacent a point where the poise precisely balances the load imposed on the beam, and an indicating means coupled to said load detector and said poise which indicates the sum of or the difference between the load deflection value detected by the said detector and the load detection value corresponding to the position of the poise as a correct weight value.

This application is a continuation-in-part of application Ser. No. 373,716, filed June 9, 1964, now abandoned.

This invention relates to a weighing machine of the sliding poise type enabling the determination of a weight value by means of moving, either automatically or manually, a poise which is fitted to the beam and reading the scale at the position where the sliding poise is balanced with the load imposed upon one end of the beam, a load deflection detector being provided to measure the load imposed upon the beam when the poise sliding on the beam stops at a place more or less adjacent the exact balancing point by means of the sum or the remainder of the value detected by the detector and the value of the place where the poise actually stops. In this invention, therefore, it is not necessary to wait until the poise stops at the exact balancing point unlike a conventional weighing machine of the same type, with the result that the time required from the commencement of the weighing operation to the end thereof can be greatly shortened as compared with a conventional weighing machine of the sliding poise type.

The following explanation, taken with the accompanying drawings, clarifies the differences between the structure and performance of the weighing machine of this invention and that of a conventional machine as well as the superiority of the weighing machine of this invention over conventional machines. In the drawings.

The performance of a conventional weighing machine will be explained with reference to FIGS. 1 and 2.

Figure 1:
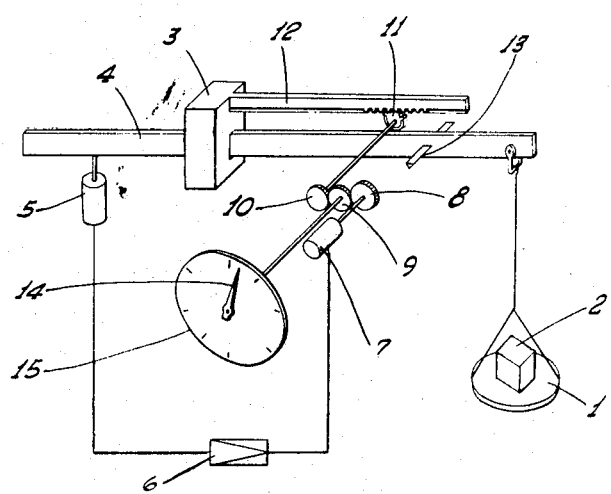
FIG. 1 is a perspective view of a conventional weighing machine.
Figure 2:
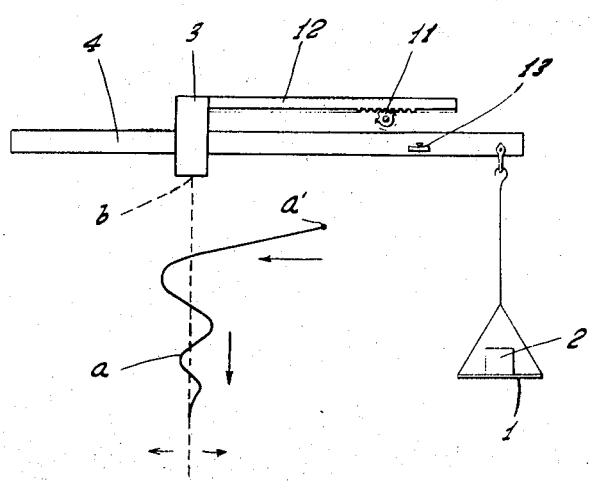
FIG. 2 is a diagram for explaining how the said weighing machine operates.

In FIGS. 1 and 2, a load carrying platform 1 is suspended at the right-hand end of the beam 4 which beam is supported by a fulcrum 13, and it is so arranged that the beam 4 is balanced horizontally when the poise 3 which is slidably fitted on the beam 4 is exactly balanced with the load 2 of the object to be weighed on the said carrying platform 1.

A rack 12 is fixed to the poise 3, and a pinion gear 11 engages with the said rack 12. A gear 10 is mounted on a shaft on the other end of which gear 11 is mounted, the said gear 10 engaging with a gear 9 which turns an indicator 14 of a scale 15. The said gear 9 engages with a gear 8 which is revolved by the motor 7.

In addition, a movable iron core of a differential transformer 5 is linked with a part of the beam 4, so that the deflection of the beam 4 can be detected by means of the differential transformer, having been amplified by a servo-amplifier 6, is transmitted to the motor 7. The arrangement is such that the motor 7 is driven by the signal transmitted from the differential transformer 5.

In the conventional weighing machine, the poise 3 stops adjacent the fulcrum 13 when the load platform 1 is devoid of a load, the indicator indicating zero on the scale board 15.

Then, when a load 2 is placed on the loading platform 1, the beam 4 tips to the right, i.e., towards the load platform. As a result, the movable iron core of the differential transformer 5 goes up and the signal transmitted from the differential transformer 5 drives the motor 7, causing the rack 12 to move in the left-hand direction by revolving the pinion gear 11 by way of the gears 8, 9, 10, thereby moving the poise 3 toward the exact balancing point corresponding to the load.

As a result, the beam 4 gradually regains its balance, and as soon as the beam 4 becomes perfectly horizontal and the poise 3 returns to its proper balancing point, the output of the differential transformer becomes zero, the motor 7 coming to a standstill. Then the value on the scale indicated by the indicator 14 shows the weight value of the load 2.

However, when the poise 3 reaches the perfect balancing point for the first time, it never comes to a standstill precisely at the said position, because of the inertia of the moving poise 3, the swinging beam 4 and the like. Even when the signal from the differential transformer becomes zero, the poise 3 never stops at the precise balancing point but comes to a standstill at a position slightly past the said point.

When the poise 3 overruns the balance point, the beam 4 inclines to the left, with the result that the iron core of the differential transformer goes down below the neutral point, a signal opposite to the former one is transmitted from the differential transformer 5 to the motor 7, causing the said motor 7 to revolve the pinion gears 11 in a direction opposite to the former one and return the poise 3 to the right. In this instance too, the poise 3 stops at a position slightly to the right of the balance point, having passed the exact balancing point. This time, however, the range of movement of the poise 3 as well as its inertia is smaller, and the poise 3 stops at a position much closer to the exact balancing point. However, the stopping point being to the right of the perfect balancing point, the motor 7 starts rotating in the first-mentioned direction, sending the poise 3 to the left again.

The poise, after repeating the aforementioned movement, ultimately comes to a standstill at the precise balancing point.

In FIG. 2, supposing that the vertical dotted line $b$ represents the line which passes through the perfect balancing point of the poise 3 for the load 2, and the curved line *a* represents the line which indicates the movement of the poise 3 to the right and left and the lapse of time is in the downward direction, and supposing that the poise 3 was located at the point *a'* before a load 2 was placed on the loading platform 1, the poise 3, when a load 2 is imposed upon the loading platform 1, repeats the right-and-left movement overrunning the precise balancing point along the curved line *a* until it finally comes to a standstill on the precise balancing point after the lapse of a period of time, the said overrunnings decreasing gradually.

In the aforementioned operation, in order to stop the poise quickly at the precise balancing point, it is necessary to bring the poise 3 to the precise balancing point as quickly as possible when the point *a'* which is the starting point of the poise 3 is rather far from the precise balancing point, and it is also necessary to slow down the speed of the poise 3 in order to minimize the overrunning of the poise 3 when the poise is located at or is coming close to the precise balancing point.

A very complicated speed control equipment is required to regulate the speed of the poise 3 as mentioned above, and even when the speed is thus controlled it usually takes approximately 15 seconds before the weighing operation is completed.

As compared with the aforementioned conventional weighing machine, the weighing machine of this invention makes it unnecessary to wait until the poise 3 comes to a standstill at the precise balancing point. Since it is only 6 to 7 seconds from the commencement to the completion of weighing in the present weighing machine, the time required for weighing can be greatly reduced.

Figure 3:
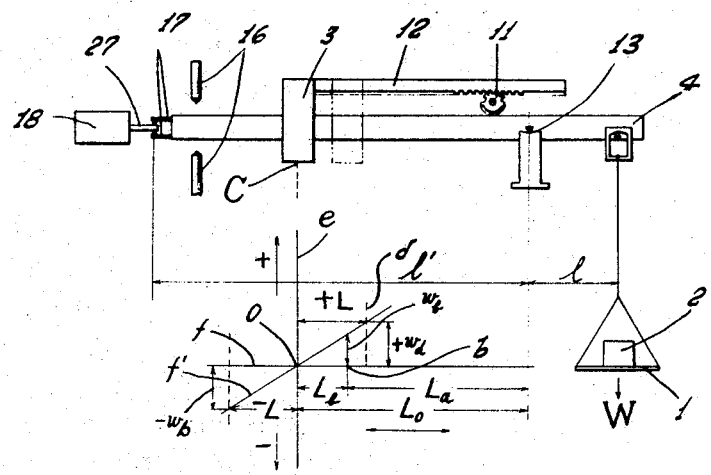
FIG. 3 is a diagrammatic elevation view of the weighing machine of this invention.

The principle of this invention will first be explained hereunder with reference to FIG. 3. In FIG. 3, the carrying platform 1 for carrying a load 2 is suspended at the right-hand end of the beam which is supported by the fulcrum 13. A rack 12 is fixed on the poise 3 fitted on the beam 4 on the left of the fulcrum 13, and a pinion gear 11 engages the rack 12. The said pinion gear 11 is revolved by a motor, whereby the poise 3 is moved along the beam 4. The arrangement thus far described is the same as that of the conventional weighing machine shown in FIGS. 1 and 2.

However, the beam 4 of the weighing machine of this invention is provided with a load deflection detector 18 which is different from the differential transformer of the conventional weighing machine as shown in FIGS. 1 and 2.

The load deflection detector 18 of this invention detects the upward or downward load imposed upon the movable part 27 thereof in the form of a variation of voltage. It is different from the differential transformer or the like which transforms the quantity of movement of the movable iron core to a variation of voltage.

As an example of a load deflection detector 18 used in this invention, a known strain gauge of the unbounded type is utilized, the movable part 27 thereof being held between a pair of protruding pieces 17 provided at one end of the beam 4. When the beam 4 is precisely horizontal, no load is imposed upon the movable part 27. However, the slightest deflection of the beam 4 causes either an upward or downward force at the left end of the lever 4, and one or the other of the protruding pieces 17 at the left end of the beam 4 pushes up or presses down the movable part 27, applying a load thereto.

The aforementioned upward or downward load arising at the left end of the beam 4 is called the load deflection which has occurred on the beam 4, the upward deflection being indicated by + and the downward one by —.

In addition, stops 16 are provided adjacent the left end of the beam 4, one above and the other below the said part, to control the deflection of the beam 4 within a predetermined deflection, so as to prevent the movable part 27 of the detector 18 from being subjected to an excessive load.

In the weighing machine of this invention shown in FIG. 3 when the load platform is empty and the beam 4 is horizontal with the poise 3 resting at the zero point adjacent the fulcrum 13, the output of the detector is zero because the movable pieces 27 of the detector 18 are free of any load.

Then, when a load is placed on the load platform 1, the beam 4 inclines downwardly to the right, imposing an upward load upon the movable part 27 of the detector 18. But when the load exceeds a certain value, the beam 4, adjacent its left end, hits the upper stop 16 preventing the movable part 27 from being subject to any further load.

As the poise 3 is gradually moved to the left by the motor, manually or by any other method, and the poise 3 is sent gradually farther from the fulcrum 13. A counterclockwise moment arising from the poise 3 increases, while the upward force occurring at the left end of the beam 4, i.e., the load deflection, decreases by degrees. When the load deflection decreases below a certain value, the beam 4 begins to regain its horizontal position, moving away from the upper stop. In this state, i.e., when the beam 4 inclines to the extent that it touches neither the upper nor the lower stopper 16, the load applied by the protruding pieces 17 of the beam 4 to the movable part 27 of the detector 18 is identical with the load deflection arising on the beam 4.

When the poise 3 reaches the precise balancing point for the load 2, the beam 4 assumes a horizontal position, neither an upward nor a downward force arising at the left end of the beam 4, i.e., the load deflection of the beam 4 is reduced to zero. Consequently, no load is imposed upon the movable part 27 by the protruding pieces 17 in this state.

In FIG. 3, the distance from the fulcrum 13 to the point of the beam 4 to which a load is applied is represented by $l$, while the distance from the fulcrum 13 to the point where the movable part 27 of the detector 18 is held between the protruding pieces 17 of the beam 4 is indicated by $l'$. The position of the poise 3 when the beam 4 is horizontal and precisely balanced with the load 2, i.e., at the precise balancing point, is at C, and the distance from the precise balancing position C to the fulcrum 13 is indicated by $L_0$.

The perpendicular *e* represents a line passing through the precise balancing point, the horizontal line *f* is a line on which the load deflection of the beam 4 can be considered to be zero, and the oblique line *f'* through the intersection of the lines *e* and *f* indicates the load deflection of the beam 4 when the poise is offset from the precise balancing point, the load deflection above the line *f* being positive, while the load deflection below the line *f* being negative.

In the aforementioned diagram, when the poise 3 moves to the right away from the precise balancing point by a distance $+L$, a load deflection of $+w_d$ is imposed upon the movable part 27 of the detector 18 by the protruding pieces 17 of the beam 4, and the beam 4 hits the upper stop 16, with the result that, even if the poise 3 is farther to the right, the load imposed upon the movable part never grows any greater than $+w_d$.

On the other hand, when the poise 3 is located to the left of the balancing point by $-L$, a load of $-w_d$ is imposed upon the movable part 27. Because the beam 4 then hits the lower stop, no additional load is applied to the movable part even when the poise 3 moves farther to the left.

Supposing that the poise 3 stops at the point *b* spaced from the fulcrum 13 a distance $L_a$ as indicated by the dotted line, and the said point *b* is spaced to the right of the precise balancing point C by a distance $L_b$, the following equation is formulated.

$$L_0 = L_b + L_a \qquad (1)$$

If the load 2 is represented by W, the weight of the poise 3 by w, and the load deflection to be imposed upon the movable part 27 by $w_b$.

$$lW - wL_a + w_b l' \quad (2)$$

That is to say, the product of the distance $l$ between the point where the load 2 is imposed upon the beam 4 and the fulcrum and W of the load 2 is identical with the sum of the product of the weight $w$ of the poise 3 and the distance $L_a$ from the point $b$ to the fulcrum 13 and the product of the load deflection $w_b$ imposed upon the movable part 27 and the distance $l'$ between the said movable part 27 and the fulcrum 13, and therefore the beam 4 comes to a standstill in the condition in which the load $w_b$ is imposed upon the movable part 27.

The following equation is obtainable by modifying Equation 2.

$$W = \frac{w}{l} L_a + \frac{l'}{l} w_b \quad (3)$$

Since $l$, $l'$ and $w$, being determined by the physical characteristics of the weighing machine, are constant, $w/l$ and $l'/l$ are values which are constant for the weighing machine. Accordingly, the following equation is obtainable by rewriting (3) with $w/l$ as a constant A and $l'/l$ as a constant B.

$$W = AL_a + Bw_b \quad (4)$$

As is clear from the above equation that since both A and B are constants, the knowledge of the value of $L_a$ and $w_b$ enables the determination of W. It is also apparent that when the point $b$ is on the right of the precise balancing point C as shown in FIG. 3, the value of $w_b$ is positive as mentioned above, while the value of $w_b$ is negative when the said point is on the left of the balancing point C.

The aforementioned is the principle of this invention, and an embodiment thereof is hereunder explained with reference to FIGS. 4–6.

Figure 4:
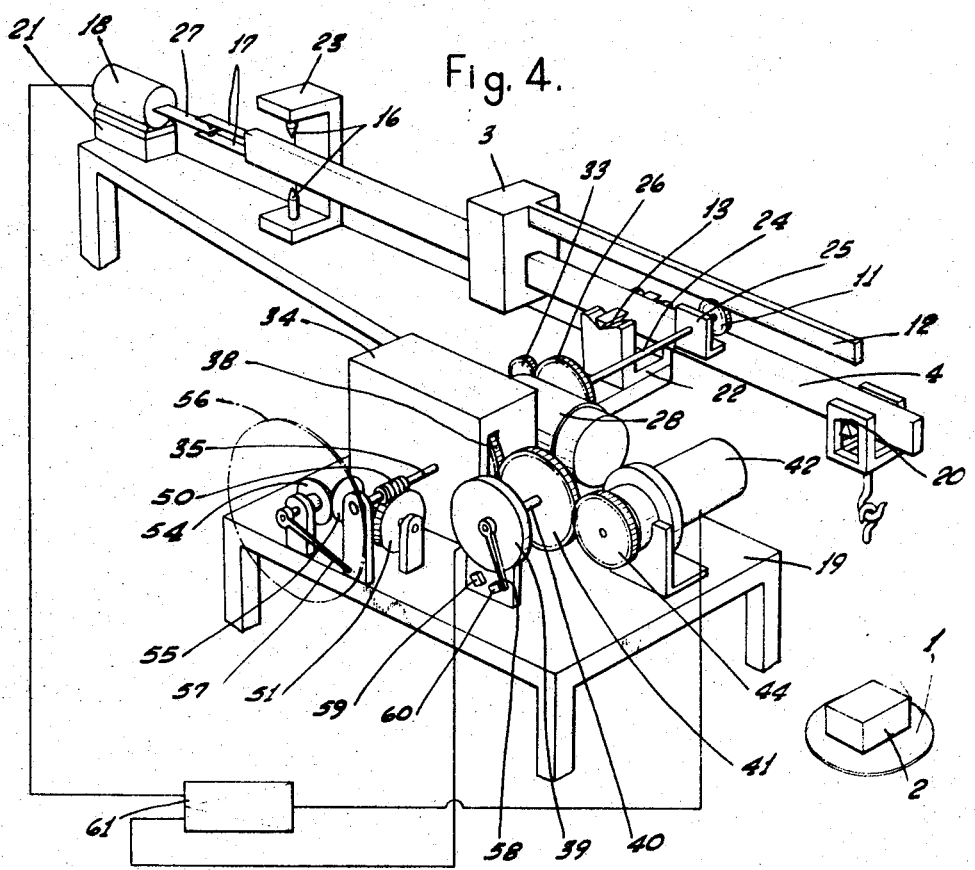
FIG. 4 is a perspective view of the weighing machine of this invention.

In FIG. 4, the fulcrum 13 of the beam 4 is supported by a support 22 on the frame 19, with the load carrying platform 1 suspended at the weight point 20 at the right-hand end of the beam 4. On the stand 21 on the left part of the frame 19 is fixedly mounted the body of the load deflection detector 18, the movable part 27 thereof being held between the upper and lower protruding pieces 17 jutting forth from the left end of the beam 4, the stops 16 which control the up-and-down movement of the beam 4 being fixedly mounted on the holder 23 which is fixedly mounted on the stand 21. The shaft 24 of the pinion gear 11, engaging with the rack 12 fixed to the poise which is slidably mounted on the beam 4, is rotatably supported by the bearing 25 provided on the beam 4, a gear 26 being fixed at the front end of the said shaft 24.

A reduction gear box 29 is fixedly attached to the motor 28 which drives the poise 3, a worm 32 fixedly attached to the shaft of the motor 28 being made to engage with a worm wheel 31 fixedly attached to the conducting shaft 30 which is rotatably mounted in the said box 29, so as to transmit the rotation of the motor 28 at a reduced speed to the conducting shaft 30.

A gear 33 fixedly attached to the rear end of the conducting shaft 30 is made to engage with the aforementioned gear 26, the point of contact of the pitch circle of the gear 33 and the pitch circle of the gear 26 being made to correspond with the horizontal line through the fulcrum of the beam 4, i.e., the oscillating axis of the beam 4, so as to prevent an error from arising at the engaging point of the gears 33 and 26 as a result of an inclination of the beam 4.

The front end of the conducting shaft 30 is supported by the box 34 of the differential gearing.

Figure 5:
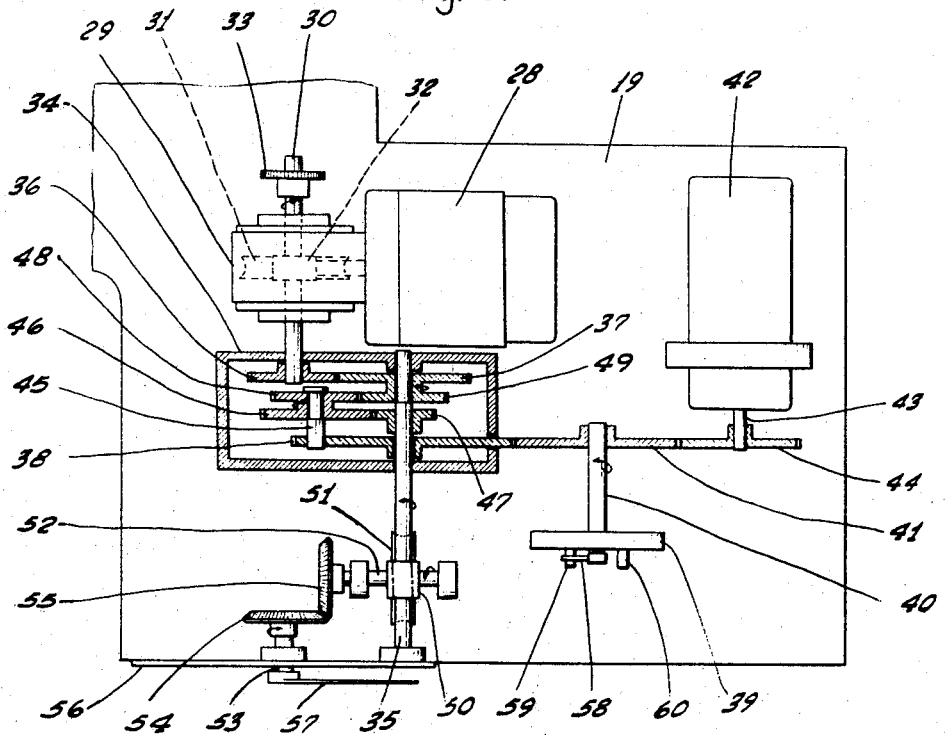
FIG. 5 is a sectional plan view on an enlarged scale showing the essential parts thereof.

The differential gearing is as shown in FIG. 5, the output shaft 35 being rotatably mounted in the gear box 34 on the right side of the shaft 30, a gear 36 being fixedly attached to the shaft 30 inside the gear box 34 and engaging with a gear 37 loosely rotatably mounted on the rear part of the shaft 35.

The part of the shaft 35 housed inside the gear box 34 is provided with a gear 38 of a large diameter freely rotatably mounted on the shaft 35, a part of the periphery of the said gear 38 protruding outwardly through a vertical slit provided on the right side of the gear box 34. The said gear 38 engages with a gear 41 fixedly attached to a rotating shaft 40 of a potentiometer 39 mounted on the frame 19. Inside the potentiometer there is an annular resistance coil and a slidable electric contact attached to the shaft 40.

A servomotor 42 is fixedly mounted on the frame 19, a gear 44 fixedly mounted on a shaft 43 of the servomotor 42 engaging with the aforementioned gear 41.

A shaft 45 is fixedly attached to a part of the aforementioned gear 38, and a planetary gear 46 is rotatably mounted on said shaft 45 and engages with a gear 47 fixedly mounted on the shaft 35.

A smaller planetary gear 48 which is integral with the said planetary gear 46 engages with a gear 49 which is integral with the said gear 37.

A worm 50 is fixedly attached to the front end of the shaft 35, and a shaft 52 which has a worm wheel 51 engaged with the said worm 50 is supported in a bearing mounted on the frame 19.

An indicator shaft 53 is rotatably mounted in a bearing at the front part of the frame 19 and has a bevel gear 54 at the rear end with a bevel gear 55 on the end of the aforementioned shaft 52. An indicator 57 which indicates the weight reading on a scale board 56 is fixedly attached to the front end of the indicator shaft 53 which is loosely inserted through a center hole in the scale board 56, which is fixedly mounted on the front part of the frame 19.

A rod 58 is fixedly attached to the front end of the shaft 40 protruding to the front side of the aforementioned potentiometer 39, and microswitches 59 and 60 which are operated by the rod 58 when the rod 58 is fully turned either to the right or to the left, are fixedly attached to the lower part of the potentiometer 39.

The output circuit of the load deflection detector 18 is connected with a servoamplifier 61, while the output circuit of the servoamplifier 61 is connected to the servomotor 42, so as to make the servomotor 42 revolve in the right hand direction, clockwise in FIG. 4, when the output voltage of the detector is positive, and to make the motor 42 revolve in the opposite direction when the output voltage of the detector 18 is negative.

The output circuit of the potentiometer 39 is connected with the balancing circuit of the servoamplifier 61, the circuit being connected in such a way that as soon as the output voltage of the potentiometer becomes equal to the output voltage of the detector 18, the servomotor 42 will stop, the output of the servoamplifier 61 being reduced to zero.

The rod 58 fixedly attached to the shaft 40 of the potentiometer presses the microswitch 59 or 60 when the output of the detector 18 is at its maximum, the switch 59 closing the circuit by being pressed by the rod 58 when the positive output of the detector 18 is at its maximum, the switch 60 closing the circuit by being pressed by the rod 58 when the negative output of the detector 18 is at its maximum.

In addition, the switches 59, 60 control the motor 28. The circuit is so arranged that the switch 59 will connect the motor 28 so as to move the poise 3 in the left direction while the switch 59 is being pressed by the rod 58, and the switch 60 will connect the motor to rotate it in the opposite direction to the abovementioned direction while the switch 60 is being pressed by the rod 58.

In the above embodiment, when no load 2 is imposed upon the load platform 1, the poise 3 stays adjacent the fulcrum, the beam 4 being at a standstill and horizontal, the output of the detector 18 being zero with no load imposed upon the movable part 27 thereof, and the indicator 57 being immobile and indicating zero on the scale board 56. In this state, the rod 58 fixedly attached to the shaft of the potentiometer 39 is located at the neutral point, contacting neither of the switches 59 or 60.

When a load 2 is imposed upon the load platform 1, the beam 4 inclines toward the right, hitting the upper stop 16. Simultaneously the movable part 27 of the detector 18 is pushed up by the protruding pieces 17, a maximum deflection arising in the resistance coil inside the detector 18, a maximum positive output, i.e., an output corresponding to $w_d$ in FIG. 3, being transmitted to the amplifier 61, the said output being applied to the servomotor 42 to rotate it, the shaft 40 of the potentiometer 39 being revolved to the left or counterclockwise in FIG. 4, through the gears 44 and 41 together with the rod 58, the said rod 58 pressing the switch 59.

As a result, the motor 28 starts, rotating the pinion gear 11 by rotating the shaft 30, the gears 33, 26 and the like, thus moving the rack 12 to the left together with the poise 3.

As the poise 3 moves to the left, the load deflection imposed upon the movable part 27 by the beam 4 decreases gradually. When the value falls below $w_d$, the beam 4 separates from the stop 16.

As a result, the output voltage of the detector 18 falls below its maximum value, and the servomotor 42 keeps revolving until the output voltage of the potentiometer 39 falls below its maximum value and becomes equal to the output of the detector 18. However, as soon as the output voltage of the potentiometer falls below its maximum value like this, the rod 58 starts to revolve to the right, or clockwise, as indicated by the dotted line in FIG. 6, and separates from the switch 59. Consequently, the switch 59 opens, stopping the motor 28 and bringing the poise 3 to a standstill.

This condition is identical with the condition in which the poise 3 stops at the point $b$ short of the precise balancing point C in FIG. 3. The number of revolutions of the shaft 30, which revolved until the poise 3, starting from the zero point, came to a standstill at the point $b$, corresponds to $L_a$ in FIG. 3. The upward load deflection $w_b$ imposed upon the movable part 27 of the detector 18 corresponds to the angle of rotation of the shaft 40 of the potentiometer 39.

Therefore, the value of the load can be obtained by figuring out the sum of the number of revolutions of the shaft 30 and the angle of rotation of the shaft 40. The arrangement is such that this sum is indicated on the output shaft 35 by means of the differential gearing inside the gear box 34.

That is, as the poise moves to the left, the shaft 30 rotates, the gear 36 rotating the gears 37 and 49 and then planetary gears 48 and 46. If the gear 38 remains immobile, the planetary gears 48 and 46 rotate at a certain fixed position, the gear 47 and the shaft 35 rotate in the + direction, the indicator 57 moves toward the positive direction i.e., in the direction indicating an increased weight, moved by the worm 50, the worm wheel 51, the bevel gears 55 and 54 and the like. The direction of rotation of each part is as indicated by the arrows in FIG. 5.

When the rod 58 rotates in the positive direction from the neutral point (counterclockwise direction in FIG. 6) the shaft 40 rotates in the direction of the arrow in FIG. 5, the gear 41 which rotates therewith making the gear 38 rotate in the direction opposite to the shaft 40.

Consequently, supposing that the gear 49 is at a standstill, the shaft 35 is rotated in the + direction by the planetary gears 46 and 48 which rotate around the shaft 35 together with the gear 38.

That is, when the poise 3 moves to the left and the shaft 40 of the potentiometer is rotated in the + direction, the shaft 35 is driven in the positive direction from both the driving shaft 30 of the poise 3 and the shaft 40 of the potentiometer 39. On the other hand, when the potentiometer 39 is rotated in the − direction, the gear 38 rotates in the opposite direction to the aforementioned direction, the shaft 35 being made to rotate in the − direction.

Since the indicator 57 assumes a position corresponding to either the sum or the remainder of the angle of rotation of the shaft 30 in proportion to the position of the poise 3 and the angle of rotation of the shaft 40 the potentiometer 39, if the number of the teeth or the like is appropriately predetermined, the value of $L_a + w_b$ or $L_a - w_b$ in FIG. 3, i.e., the value indicating the weight W, is indicated by the indicator 57.

One of the main characteristics of the weighing machine of this invention consists in the fact that this weighing machine makes it unnecessary to wait until the poise sliding on the beam comes to a standstill at the proper balance position corresponding to the load of the object to be weighed.

That is, in case of the weighing machine of this invention, it is only necessary to make the poise stop at any arbitrary position within a certain range with the precise balancing point as a center. Accordingly, it is not necessary to reduce the speed of the poise when it nears the precise balancing point as in the case of the conventional weighing machine.

Therefore, the time required for the weighing operation can be greatly shortened as compared with the case of the conventional weighing machine.

Figure 6:
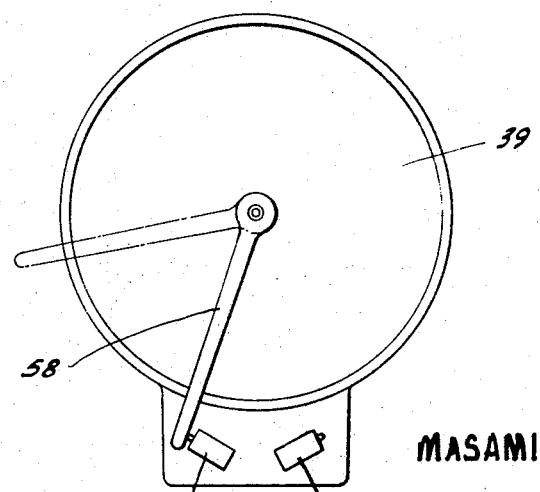
FIG. 6 is a front view of the potentiometer used in the weighing machine of this invention.

Further, if the switches 59 and 60 operated by the rod 58 in FIG. 6 are replaced with push buttons and removed to some other place for easy manipulation, the same weighing operation can be performed by freely moving the poise 3 by opening or closing the switch 59 or 60 by hand. Besides, the poise can be moved manually instead of by motor, or the pinion gear 11 can be rotated through the reduction gear by turning the handle.

In any case, as there is no need of making the poise stop at the precise balance point, the weighing operation can be performed with greater efficiency.

Some of the conventional weighing machines have been so designed that the grosser graduations were detected by the position of the weight, only the excess load showing itself in between these grosser graduations being gauged by a kind of voltage gauge worked by the beam. However, in this type of conventional weighing machine it was necessary first to move the weight accurately to an anticipated position in graduations of 10 kg.—say 10 kg., 20 kg., 30 kg. (supposing that 10 kg. is the unit of weighing in this instance), stop the weight there and then proceed to detect a load below 10 kg. between the grosser graduations by means of a detector similar to a voltage gauge. The drawbacks in this are that a complicated device is necessary to assure the stoppage of the poise at the right point, much time is needed, the value of the load is not known until the poise has stopped at the exact spot, and errors may creep in because of possible deviations of the poise from the right spot.

By contrast, in this invention the position of the poise 3 serves to show not only the grosser graduations, but also finer graduations, so that the weight 3 need not be stopped in a precise balance position, but may be left to seek its position anywhere within the range in which the beam 4 does not strike the stop 16.

Thus, the poise 3 is stopped by the signal that the beam has come off the stop 16, i.e., the signal that the rod 58 has come off the microswitch 59 or 60. This greatly simplifies the device for starting and stopping the movement of the poise 3.

Now suppose that a load 2 having a weight of 55.00 kg. is weighed by using the apparatus of this invention. If the poise 3 stops at a point corresponding to 54.4 kg., then the detector 18 will indicate the value corresponding to $55.00 - 54.41 = +0.59$ kg. On the other hand, if the poise 3 stops at a point corresponding to 55.82 kg., then the detector 18 will indicate the value corresponding to 55.00—55.82—0.82 kg.

Consequently, this invention makes it possible to obtain the exact value of the load by means of a simple device which indicates the sum of or the difference between the detected value of the load deflection detector 18 and the value corresponding to the position of the poise 3 as a correct weight value. The result is a simplification of the mechanism and control circuit.

In the foregoing embodiment of the invention, the automatic weighing machine is driven by the motor to automatically move the poise toward the place adjacent the exact balancing point. But this invention can be applied to not only a weighing machine driven by a motor which can be started and stopped manually but also a weighing machine which is manually operated. Likewise the present invention can be utilized in other weighing machines for various different requirements.

While the preferred embodiment has been described in detail, it will be understood that numerous modifications might be resorted to.

I claim:
1. A weighing machine consisting of a fulcrum, a beam supported on a fulcrum and on a part of which beam an object to be weighed is to be positioned, a poise slidably mounted on the said beam, a load deflection detector engageable by said beam for detecting the upward or downward load deflection of the beam when the poise comes adjacent a point where the poise precisely balances the load imposed on the beam, and an indicating means coupled to said load deflection detector and said poise which indicates the sum of or the difference between the load deflection value detected by the said detector and the load detection value corresponding to the position of the poise as a correct weight value.

2. A weighing machine as claimed in claim 1 in which the poise is freely movable by hand.

3. A weighing machine as claimed in claim 1 including a motor coupled to the poise to drive the poise, and manually operable switch means coupled to said motor for controlling the power supply to the motor so that the motor can be in a forward or reverse direction.

4. A weighing machine as claimed in claim 1 including a motor coupled to the poise for driving the poise, and an automatic control system coupled to the motor and responsive to the movement of the beam for automatically controlling the driving motor for automatically moving the poise to a place adjacent the precise balancing point for the load and automatically stopping the poise at a place adjacent the precise balancing point.

5. A weighing machine as claimed in claim 1 further including a first input shaft coupled to the poise which rotates along with the movement of the poise, a second input shaft coupled to said load deflection detector which rotates an amount corresponding to the detected value of the load deflection detector, differential gearing having an output shaft and coupled to said input shafts which converts the sum of or the difference between the rotations of the input shafts into rotation of said output shaft, the said output shaft indicating the weigh value of the load on the beam.

6. A weighing machine as claimed in claim 1, further including a potentiometer, a servomechanism coupled to and actuated by the output signal of the load deflection detector, and driving said potentiometer, a control system coupled to the poise which sends the poise toward the precise balancing point, said control system including a driving motor to which said potentiometer is coupled for controlling the motor, the motor being driven when the output voltage of the potentiometer reaches a maximum and being stopped as soon as the output voltage of the potentiometer falls below its maximum value.

References Cited
UNITED STATES PATENTS

| | | | |
|---|---|---|---|
| 1,328,320 | 1/1920 | Crane | 177—214 |
| 1,765,495 | 6/1930 | McKim | 177—214 |
| 2,741,472 | 4/1956 | Thayer et al. | 177—215 |
| 3,123,164 | 3/1964 | Echenique et al. | 177—214 X |

RICHARD B. WILKINSON, Primary Examiner

GEORGE H. MILLER, JR., Assistant Examiner